US011626609B2

United States Patent
Noponen

(10) Patent No.: US 11,626,609 B2
(45) Date of Patent: Apr. 11, 2023

(54) CONTACTING METHOD AND ARRANGEMENT FOR FUEL CELL OR ELECTROLYZER CELL STACK

(71) Applicant: ELCOGEN OY, Vantaa (FI)

(72) Inventor: Matti Noponen, Espoo (FI)

(73) Assignee: ELCOGEN OY, Vantaa (FI)

( * ) Notice: Subject to any disclaimer, the term of this patent is extended or adjusted under 35 U.S.C. 154(b) by 621 days.

(21) Appl. No.: 15/276,044

(22) Filed: Sep. 26, 2016

(65) Prior Publication Data

US 2017/0047606 A1 Feb. 16, 2017

Related U.S. Application Data

(63) Continuation of application No. PCT/FI2014/050215, filed on Mar. 25, 2014.

(51) Int. Cl.
*H01M 8/04* (2016.01)
*H01M 8/242* (2016.01)
(Continued)

(52) U.S. Cl.
CPC ............... *H01M 8/242* (2013.01); *C25B 9/73* (2021.01); *H01M 8/0258* (2013.01);
(Continued)

(58) Field of Classification Search
CPC .. H01M 8/242; H01M 8/2432; H01M 8/0258; H01M 8/0273; H01M 8/0297;
(Continued)

(56) References Cited

U.S. PATENT DOCUMENTS 5,453,331 A * 9/1995 Bloom ................... C03C 3/064
429/174
6,344,290 B1 2/2002 Bossel
(Continued)

FOREIGN PATENT DOCUMENTS

EP       1 187 243 A2    3/2002
JP      2012-119126 A    6/2012
(Continued)

OTHER PUBLICATIONS

Corrosionpedia (Oxide Layer definition, p. 1 {https://www.corrosionpedia.com/definition/1619/oxide-layer} online Wayback evidence Feb. 18, 2015).*
(Continued)

*Primary Examiner* — Olatunji A Godo
(74) *Attorney, Agent, or Firm* — Buchanan Ingersoll & Rooney PC

(57) ABSTRACT

A contacting arrangement of solid oxide cells is disclosed, each solid oxide cell having at least two flow field plates to arrange gas flows in the cell, and an active electrode structure, which has an anode side, a cathode side, and an electrolyte element between the anode side and the cathode side. The contacting arrangement includes a gasket structure to perform sealing functions in the solid oxide cell and a contact structure located between the flow field plates and the active electrode structure, the contact structure being at least partly a gas permeable structure configured and adapted according to structures of the flow field plates and according to the active electrode structure.

7 Claims, 5 Drawing Sheets

(51) Int. Cl.
| | |
|---|---|
| *H01M 8/2432* | (2016.01) |
| *H01M 8/0273* | (2016.01) |
| *H01M 8/2425* | (2016.01) |
| *H01M 8/0258* | (2016.01) |
| *H01M 8/0297* | (2016.01) |
| *C25B 9/73* | (2021.01) |
| *H01M 8/12* | (2016.01) |

(52) U.S. Cl.
CPC ....... *H01M 8/0273* (2013.01); *H01M 8/0297* (2013.01); *H01M 8/2425* (2013.01); *H01M 8/2432* (2016.02); *H01M 2008/1293* (2013.01)

(58) Field of Classification Search
CPC ........ H01M 8/2425; H01M 2008/1293; H01G 11/72
See application file for complete search history.

(56) References Cited

U.S. PATENT DOCUMENTS

| | | | |
|---|---|---|---|
| 6,670,068 B1 | 12/2003 | Diez | |
| 2003/0077498 A1* | 4/2003 | Cable | H01M 8/0256 429/444 |
| 2004/0086769 A1 | 5/2004 | Diez | |
| 2005/0191538 A1 | 9/2005 | Diez | |
| 2006/0246331 A1* | 11/2006 | Steinbroner | H01M 8/2475 429/416 |
| 2007/0072046 A1* | 3/2007 | Thompson | H01M 4/8621 429/486 |
| 2009/0098432 A1* | 4/2009 | Rosenberg | H01M 8/0247 429/444 |
| 2009/0191447 A1 | 7/2009 | Diez | |
| 2012/0107714 A1* | 5/2012 | Day | H01M 8/12 429/457 |

FOREIGN PATENT DOCUMENTS

| | | |
|---|---|---|
| JP | 2012119126 A2 | 6/2012 |
| JP | 2012123994 A2 | 6/2012 |
| JP | 2012-190746 A | 10/2012 |
| KR | 20100029333 A | 3/2010 |
| KR | 20100073834 A | 7/2010 |
| KR | 20120074563 A | 7/2012 |

OTHER PUBLICATIONS

Office Action (Notice of Reason(s) for Rejection) dated Feb. 6, 2018, by the Japanese Patent Office in corresponding Japanese Patent Application No. 2016-558377, and an English Translation of the Office Action. (9 pages).
International Search Report (PCT/ISA/210) dated Nov. 25, 2014, by the European Patent Office as the International Searching Authority for International Application No. PCT/FI2014/050215.
Written Opinion (PCT/ISA/237) dated Nov. 25, 2014, by the European Patent Office as the International Searching Authority for International Application No. PCT/ FI2014/050215.
Written Opinion of the International Preliminary Examining Authority (PCT/IPEA/408) dated Mar. 3, 2016, by the European Patent Office for International Application No. PCT/ FI2014/050215.
International Preliminary Report on Patentability (PCT/IPEA/409) dated Jul. 7, 2016, by the European Patent Office for International Application No. PCT/ FI2014/050215.

* cited by examiner

CONTACTING METHOD AND ARRANGEMENT FOR FUEL CELL OR ELECTROLYZER CELL STACK

RELATED APPLICATION

This application claims priority as a continuation application under 35 U.S.C. § 120 to PCT/FI2014/050215 filed as an International Application on Mar. 25, 2014 designating the U.S., the entire content of which is hereby incorporated by reference in its entirety.

FIELD

Most of the energy of the world is produced by oil, coal, natural gas or nuclear power. All these production methods have their specific issues as far as, for example, availability and friendliness to environment are concerned. As far as the environment is concerned, especially oil and coal cause pollution when they are combusted. As issue with nuclear power is, at least, storage of used fuel.

Especially because of the environmental issues, new energy sources, more environmentally friendly and, for example, having a better efficiency than the above-mentioned energy sources, have been developed. Fuel cell's, by which energy of fuel, for example biogas, is directly converted to electricity via a chemical reaction in an environmentally friendly process and electrolysers, in which electricity is converted to a fuel, are promising future energy conversion devices.

Renewable energy production methods such as photovoltaic and wind power face issues in seasonal production variations as their electricity production is limited by environmental effects. In the case of over production, hydrogen production through water electrolysis is suggested to be one of the future energy storing options. Furthermore, an electrolysis cell can be utilized to produce high quality methane gas from renewably biogas stores.

The present disclosure relates to arranging input reactant distribution in a Solid Oxide Fuel Cell (SOFC) stack or in a Solid Oxide Electrolyzer Cell (SOEC) stack. A fuel cell causes input reactant fuel gas on an anode electrode and gaseous oxidizer (oxygen) on a cathode electrode to react in order to produce electricity. Electrolyzer reactions are reverse to fuel cell; i.e., electricity is used to produce fuel and oxygen. SOFC and SOEC stacks include stacked cell elements and separators in a sandwiched manner wherein each cell element is constituted by sandwiching an electrolyte between the anode side and the cathode side. The reactants are guided by flow field plates to the porous electrodes.

BACKGROUND INFORMATION

An exemplary fuel cell, as presented in FIG. 1, includes an anode side 100 and a cathode side 102 and an electrolyte material 104 between them. In solid oxide fuel cells (SOFCs) oxygen 106 is fed to the cathode side 102 and it is reduced to negative oxygen ion. The negative oxygen ion goes through the electrolyte material 104 to the anode side 100 where it reacts with fuel 108 producing electrons, water and also typically carbon dioxide (CO2). Anode 100 and cathode 102 are connected through an external electric circuit 111 having a load 110 for the fuel cell withdrawing electrical energy alongside heat out of the system. The fuel cell reactions in the case of methane, carbon monoxide and hydrogen fuel are shown below:

Anode: $CH_4 + H_2O = CO + 3H_2$ $CO + H_2O = CO_2 + H_2$ $H_2O^{2-} = H_2O + 2e^-$ Cathode: $O_2 + 4e^- = 2O^{2-}$ Net reactions: $CH_4 + 2O_2 = CO_2 + 2H_2O$ $CO + \frac{1}{2}O_2 = CO_2$ $H_2 + \frac{1}{2}O_2 = H_2O$ In an electrolysis operating mode (i.e., solid oxide electrolyzer cells (SOEC)) the reaction is reversed; i.e., heat, as well as electrical energy from a source 110, are supplied to the cell where water and often also carbon dioxide are reduced in the cathode side 100 forming oxygen ions, which move through the electrolyte material 104 to the anode side 102 where oxygen oxidation reaction takes place. It is possible to use the same solid electrolyte cell in both SOFC and SOEC modes.

Solid oxide electrolyser cells operate at temperatures which allow high temperature electrolysis reaction to take place, the temperatures being for example, between 500-1000° C., but even over 1000° C. temperatures may be useful. These operating temperatures are similar to those conditions of the SOFCs. The net cell reaction produces hydrogen and oxygen gases. The reactions for one mole of water are shown below:

Cathode: $H_2O + 2e^- \rightarrow 2H_2 + O^{2-}$

Anode: $O^{2-} \rightarrow \frac{1}{2}O_2 + 2e^-$

Net Reaction: $H_2O \rightarrow H_2 + \frac{1}{2}O_2$.

In Solid Oxide Fuel Cell (SOFC) and Solid Oxide Electrolyzer (SOE) stacks, the flow direction of the cathode gas relative to the anode gas internally in each cell as well as the flow directions of the gases between adjacent cells, are combined through different cell layers of the stack. Further, the cathode gas or the anode gas or both can pass through more than one cell before it is exhausted and a plurality of gas streams can be split or merged after passing a primary cell and before passing a secondary cell. These combinations serve to increase the current density and minimize the thermal gradients across the cells and the whole stack.

A SOFC delivers in normal operation a voltage of approximately 0.8V. To increase the total voltage output, the fuel cells can be assembled in stacks in which the fuel cells are electrically connected via flow field plates (also: interconnector plates, bipolar plates). The desired level of voltage determines the number of cells needed.

Bipolar plates separate the anode and cathode sides of adjacent cell units and at the same time enable electron conduction between anode and cathode. Interconnects, or bipolar plates can include a plurality of channels for the passage of fuel gas on one side of an interconnect plate and oxidant gas on the other side. The flow direction of the fuel gas is defined as the substantial direction from the fuel inlet portion to the fuel outlet portion of a cell unit. Likewise, the flow direction of the oxidant gas, the cathode gas, is defined as the substantial direction from the cathode inlet portion to the cathode outlet portion of a cell unit.

The cells can be stacked one on top of each other with a complete overlap resulting in a stack with for instance co-flow having all fuel and oxidant inlets on one side of the stack and all fuel and oxidant outlets on the opposite side.

One feature affecting the temperatures of the structure in operation is steam reformation of the fuel that is fed into the cell. Steam reformation is an endothermic reaction and cools the fuel inlet edge of the cell. Due to the exothermicity of the electrochemical process, the outlet gases leave at higher temperature than the inlet temperature. When endothermic and exothermic reactions are combined in an SOFC stack a significant temperature gradient across the stack is generated. Large thermal gradients induce thermal stresses in the stack which are highly undesirable and they entail difference in current density and electrical resistance. Therefore the issue of thermal management of an SOFC stack exists: to reduce thermal gradients enough to avoid unacceptable stresses and to maximize electric efficiency through homogenous current density profile.

It is often necessary in known embodiments to protectively coat the flow field plates in order to slow down corrosion of the metal. Generally there are two corrosion mechanisms that cause aging to solid oxide fuel cells and electrolyzers. One is the formation of an oxide layer, that conducts electricity poorly, onto the metal surface and another the settling of chrome compounds evaporating from metal onto the active surfaces of the unit cell and reaction with electrochemically active materials weakening the electrochemical, chemical, electrical conductivity and/or gas permeability properties of the active material. Oxide structures have been used as protective coatings that on one hand slow down oxidant diffusion onto the surface of the metal and on the other hand diffusion of alloy atoms and compounds through the oxide structure. The price of the protective coating can be significant within the total costs of the cell stack and cost of the protective coating is on one hand influenced by the fabrication process used for the protective coating, the material and the surface to be coated protectively. Additionally it is not desirable to extend the protective coating to areas, which are used to seal the cell stack, because glass, ceramic materials or minerals generally used as sealants can react with the protective coating causing aging effects to the cell stack structures, for example because of increased gas leakages and/or increased electric conductivity.

Known fuel cell stacks or electrolyzer cell stacks have tolerance variations in electrolyte element structure thickness between the cell structures in the stacks. For example in a cell stack structure, in which ceramic materials are used, thickness variations in the measure of only micrometers would be desired in known embodiments. This results for example, on differential flow resistance conditions between the cells causing varying cell voltage profiles in the stack structure resulting in thermal gradients between the cells and decreased power density of the stack and varying contact properties due to uneven compression characteristics between the active electrolyte element and the flow field plate. Thus both the duty ratio of the stacks is decreased, and lifetime of the stacks is shortened, the first increasing the capital cost of the stack per produced electrical power output and the later increasing the operational cost of the stack structure as e.g. the stack replacement time is shortened in a fuel cell system and cost of electricity is increased in the electrolyzer stack.

Known fuel cell stacks or electrolyzer cell stacks suffer also from restricted flow conditions due to low gas channel conditions between the flow field plate and active electrode material such as the cathode material resulting in high pressure loss characteristics. An optimal structure for the interconnect would be to maximize the flow channels height with a channel form as close to rectangular as possible in order to maximize the flow area at the both sides of the plate. The contact surface between the interconnect plate structure and an active electrode formed on the top of the flow field plate channel should be as flat as possible to form good contact surface between the two structures. Optimal dimensions for the width of the channel and for the contact surface for example related to the properties of the active electrolyte material such as the electric conductivity and gas permeability can be in millimeter range. Known interconnect structures are made with forming processes from sheet metal plates. The maximum formability of the metal is limited by its mechanical properties and both the channel area and the contact surfaces are not optimal as described above. Because of the limitation associated to the forming processes, interconnect plate structures either cause major pressure loss characteristics and/or the contact surface limits the electron transfer in the fuel cell both causing restrictions to the duty ratio of fuel cell or electrolyzer stack.

SUMMARY

A contacting arrangement of solid oxide cells is disclosed, each solid oxide cell having at least two flow field plates to arrange gas flows in the cell, and an active electrode structure, which includes a fuel side, an oxygen side, and an electrolyte element between the fuel side and the oxygen side, wherein the contacting arrangement comprises: a gasket structure to perform sealing functions in a solid oxide cell; a contact structure configured for placement between flow field plates and an oxygen side of an active electrode structure, the contact structure being made of perforated metal which is protectively coated with oxide structures, said contact structure being at least partly a gas permeable structure having perforated holes, the contact structure being configured and adapted according to structures of the flow field plates and according to structures of the oxygen side, and a thickness of the gasket structure configured and adapted according to a thickness of the contact structure allowing tolerance variations to a thickness of solid oxide cells; and means for enhancing at least one of electric conductivity, heat transfer characteristics and mechanical support of the contact structure by selection of a distance between two adjacent holes and by minimizing a size of the holes in perforation of the contact structure.

A contacting method for solid oxide cells in which gas flows is also disclosed, the method comprising: sealing a solid oxide cell by a gasket structure, and locating a contact structure between flow field plates and an oxygen side of an active electrode structure, the contact structure being made of perforated metal, which is protectively coated with oxide structures; configuring and adapting said contact structure at least partly by a gas permeable structure having perforated holes according to the gas flows in the cell and according to structures of the oxygen side; configuring and adapting a thickness of the gasket structure according to a thickness of the contact structure allowing tolerance variations to thickness of solid oxide cells; and enhancing at least one of electric conductivity, heat transfer characteristics and mechanical support of the contact structure by selecting a distance between two adjacent holes and by minimizing size of the holes during a perforation of the contact structure.

BRIEF DESCRIPTION OF THE DRAWINGS

Other features and advantages of the present disclosure will become apparent to those skilled in the art upon reading the detailed description of the embodiments in conjunction with the accompanying drawings, wherein.

DETAILED DESCRIPTION

Figure 1:
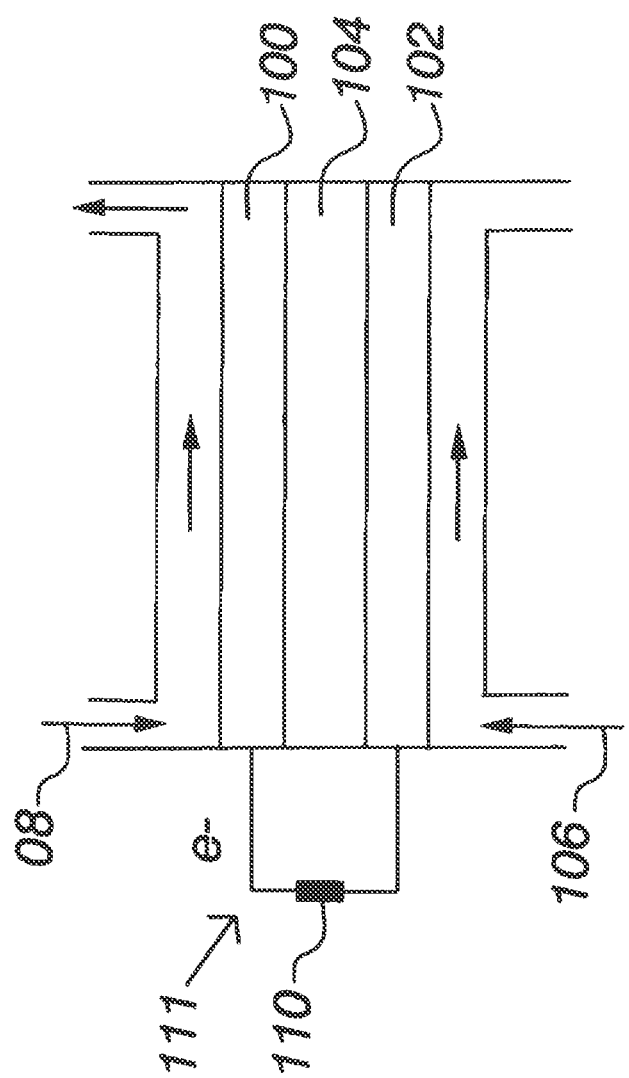
FIG. 1 shows an exemplary single fuel cell structure.

An advanced solid oxide cell structure is disclosed which has improved gas flow conditions characteristics and improved tolerance characteristics. This is achieved by a contacting arrangement of solid oxide cells, each solid oxide cell having at least two flow field plates to arrange gas flows in the cell, and an active electrode structure, which includes an anode side, a cathode side, and an electrolyte element between the anode side and the cathode side. The contacting arrangement includes a gasket structure to perform sealing functions in the solid oxide cell and a contact structure located between the flow field plates and the active electrode structure, the contact structure being at least partly a gas permeable structure being configured and adapted according to structures of the flow field plates and according to structure of the active electrode structure.

A contacting method of solid oxide cells is also disclosed by which method gas flows are arranged in the cell. In the method sealing functions are performed in the solid oxide cell, and a contact structure is established between the gas flows in the cell and an active electrode structure, and the contact structure is at least partly configured with a gas permeable structure according to the gas flows in the cell and according to structure of the active electrode structure.

A contact structure is disclosed between flow field plates and the active electrode structure, and a gas permeable structure is configured and adapted according to structures of the flow field plates or according to structure of the active electrode structure or according to structures of both of them.

Exemplary benefits are that a better duty ratio of the solid oxide cells' operation can be achieved, and a longer lifetime of the solid oxide cells can be achieved, thus making power operation of the entire cell system better and more economical as compared to the known embodiments.

According to exemplary embodiments, the fuel cell or electrolyzer stack modules at least one single repetitious structure. A single repetitious structure includes at least one electrochemically active electrolyte element structure having a fuel side, an electrolyte in between, and an oxygen rich side, placed between at least two flow field plates for distributing oxygen rich gas in the oxygen rich side of the electrolyte element structure and for distributing fuel gas in the fuel side of the electrolyte element, and includes at least one sealing means sealing the gas atmosphere at its intended enclosure. The flow field plate has at least one inlet opening for fuel gas and/or oxygen rich gas and at least one outlet opening for used fuel gas and/or oxygen rich gas.

Exemplary manufacturing methods for forming the contoured (as example: corrugated) surface are methods using plastic deformation such as stamping, pressing and like, wherein the shape of the material is changed but no material is added or removed, or methods wherein material is added such as welding or removed such as etching. Other manufacturing methods can be utilized if the flow field material is brittle such as extrusion, casting, printing, molding, and like. The orifices for fuel and air can for example, be made in a same manufacturing step.

Each flow field plate 121 can be made similar in the stack assembly structure, thus only one type of plate is needed to produce a fuel cell stack having desired amount of repetitious electrolyte element structures 104. This simplifies the structure and eases manufacturing of the fuel cells.

In fuel cell and electrolyzer systems, it is important to maximize the efficiency of electricity production. This is affected considerably on one hand by the fuel cell's/electrolyzer's own inner efficiency, but also considerably by the energy needed for feeding the gases. The energy needed for feeding gases and especially air is defined by the back pressure generated by the system and generally the component generating the most significant pressure loss in the systems is the fuel cell/electrolyzer itself. Thus, known systems are configured to reduce pressure loss of the field flow plate 121; i.e., flow channel system plate. This is achieved by maximizing the surface area perpendicular to the main flow direction of the flow area. Because it is mainly desired to direct gases only via the active area of the unit cell, pressure loss can be reduced considerably by increasing the channel system's height.

On the other hand it is a requirement for the flow channel system to transfer generated and required electrons from one electrode to another. Thus the material of the flow channel system needs to be fabricated of material that conducts electricity well. Additionally, electron collection from the electrode to an interconnect plate structure needs to be such that the portion of ohmic loss stays as small as possible in the area of the active electrode. The portion of loss in the current collection of the active area is defined by the active area material's conductivity, thickness of the material, as well as the distance an electron travels when it either transfers from the flow channel plate onto the surface of the active electrode and from there to the place of reaction or respectively vice versa. A current collection area inside the flow channel plate on top of an active area that is too large again is not desirable, because then access for gases to the reaction surface is hindered. It is possible to find an optimum size of the contact surface between the flow channel plate and the active electrode, when supply of gases to the reaction surface as well as the electrons' travel are optimized and the fuel cell's/electrolyzer's performance and efficiency can thus be optimized.

Flow field plates 121, i.e. flow channel plates and interconnect plate structures, are generally fabricated of steel, because of its sufficient electrical conductivity, corrosion resistance, a thermal expansion coefficient similar to the unit cell and good formability properties. When a steel plate is formed, the material stretches and thus thins in the locations of the formed areas. Each material has its own characteristic maximum for forming properties and if that is surpassed, ruptures and cavities form in the material. Additionally excessive forming of the material can thin the base material excessively increasing material corrosion and shortening the life of the fuel cell/electrolyzer. Therefore in material forming gentle and rounded shapes are desired. Because forming sets boundaries on the design of the channel, either the contact surface or the height of the channel often stays too small increasing thus inner ohmic losses and/or flow pressure losses of the cell stack.

Figure 2:
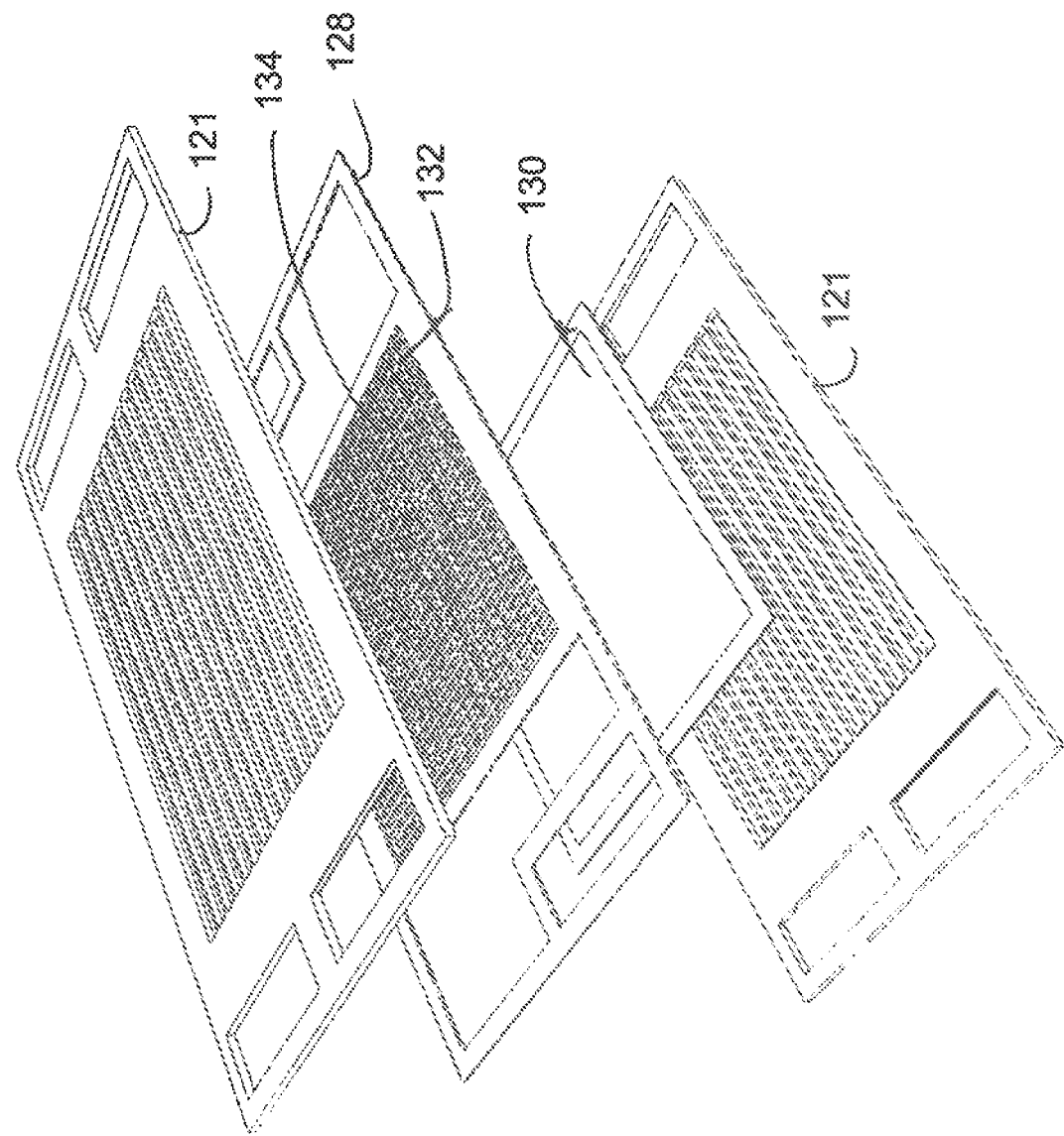
FIG. 2 shows an exemplary solid oxide cell structure according to the present disclosure.

FIG. 2 shows an exemplary contacting arrangement of a solid oxide cell structure according to the present disclosure. The solid oxide cell can be a fuel cell or an electrolyzer cell. Structure of the solid oxide cell is planar in exemplary embodiments according to the present disclosure, but embodiments disclosed herein can also be utilized in other kinds of solid oxide cell structures. A thickness of the anode is for example, 200 micrometers or more, a thickness of the electrolyte for example 1-10 micrometers, and a thickness of the cathode is for example 30-100 micrometers in an anode supported solid oxide cell structure. A thickness of the anode is for example, 30 micrometers or more, a thickness of the electrolyte is for example 30 micrometers or more, and a thickness of the cathode is for example 30-100 micrometers in an electrolyte supported solid oxide cell structure. Each solid oxide cell includes at least two flow field plates 121 to arrange gas flows in the cell, and an active electrode structure 130, which shows in more detail in FIG. 1 which includes an anode side 100, a cathode side 102, and an electrolyte element 104 between the anode side and the cathode side. The contacting arrangement includes a gasket structure 128 to perform sealing functions in the solid oxide cell and a contact structure 132 located between the flow field plates 121 and the active electrode structure 130. The contact material can be made of electrically conducting material, such as metal or ceramics. The contact structure 132 is at least partly configured and/or adapted with a gas permeable structure 134 according to structures of the flow field plates 121 and according to structure of the active electrode structure 130. In exemplary embodiments according to the present disclosure the contact structure 132 is planar and platy, but also other forms can be utilized.

Figure 3B:
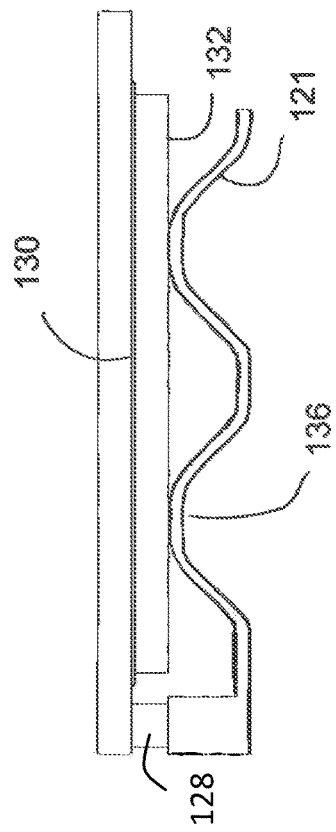
FIGS. 3A-B shows an exemplary comparison between A) a known cell structure, and B) a cell structure according to the present disclosure.
Figure 3A:
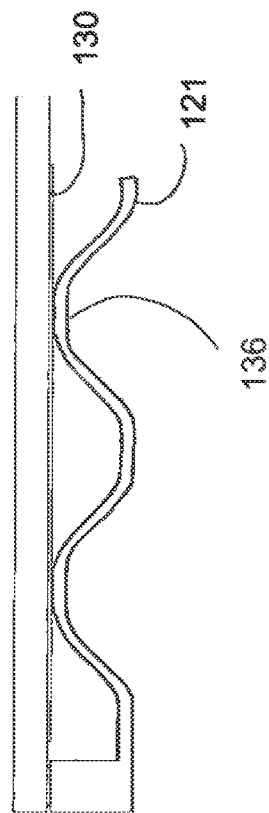

FIGS. 3A-B show an exemplary comparison between A) a known cell structure and B) a cell structure according to the present disclosure. Reference number 136 indicates a height of the gas flow channel 136 formed by a wave form structure of the flow field plate 121. The height of the gas flow channel 136 can be increased in embodiments of the present disclosure to improve gas flow characteristics of the solid oxide cell. Gas flow resistance of the gas flow channels 136 can be minimized on the basis of the optimization of the height and shape of the gas flow channels. For example, increased channel height decreases flow resistance but at the same time increases the distance of the current collection area in the interconnect plate because of forming limitations leading to increased ohmic losses in the structure.

In exemplary arrangements according to the present disclosure the contact structure 132 is located between the flow field plates 121 and the cathode side 102 of the active electrode structure 130, but also other locations can be utilized in other embodiments disclosed herein.

The contact structure 132 according to an exemplary embodiment of the present disclosure can be configured with a gas permeable structure by utilizing at least one of the following characteristics: form of the holes, size of the holes, distance between the holes, porosity of the structure 132 and tortuosity of the structure 132. FIG. 2 shows an exemplary embodiment in which the contact structure includes rectangular holes, which can be extended to two adjacent gas channels to improve gas distribution characteristics for example, by evening out differences between gas flows of two adjacent gas flows. Gas distribution from the gas flow channels 136 to the active electrode structure 130 can be improved by increasing a size of the holes, and by minimizing the distance between two adjacent holes. Electric conductivity, heat transfer characteristics and mechanical support of the structure can on the other hand be improved by increasing the distance between the two adjacent holes and by minimizing a size of the holes.

Material of the contact structure 128 can include for example, protectively coated metal, for example, with oxide structures, or electrically conductive gas permeable ceramic sinter structure between the flow field plates 121 and the active electrode structure 130 to prevent evaporation of chrome. Thickness of the contact structure 132 can be optimized according to at least one of the following characteristics: heat transfer characteristics, electrical characteristics of the contacting arrangement and gas distribution characteristics. Thickness of the gasket structure 128 can be configured and adapted according to thickness of the contact structure 132 allowing more tolerance variations to thickness of solid oxide cells. The contact structure 132 can be made and processed by various manufacturing methods such as for example by: perforation, die cutting, etching, molding, rouletting a net structure, a porous sinter structure and/or an expanded mesh to form the gas permeable contact structure 132. Perforation can include cutting rows and columns of small holes. Die cutting can include a process of using a die to shear webs of low strength materials; e.g., clicking or dinking. Expanded mesh can include producing expanded metal, a sheet or plate, by simultaneously slitting and stretching. Rouletting can include accomplishing small horizontal and vertical cuts to the contact structure material.

Figure 4:
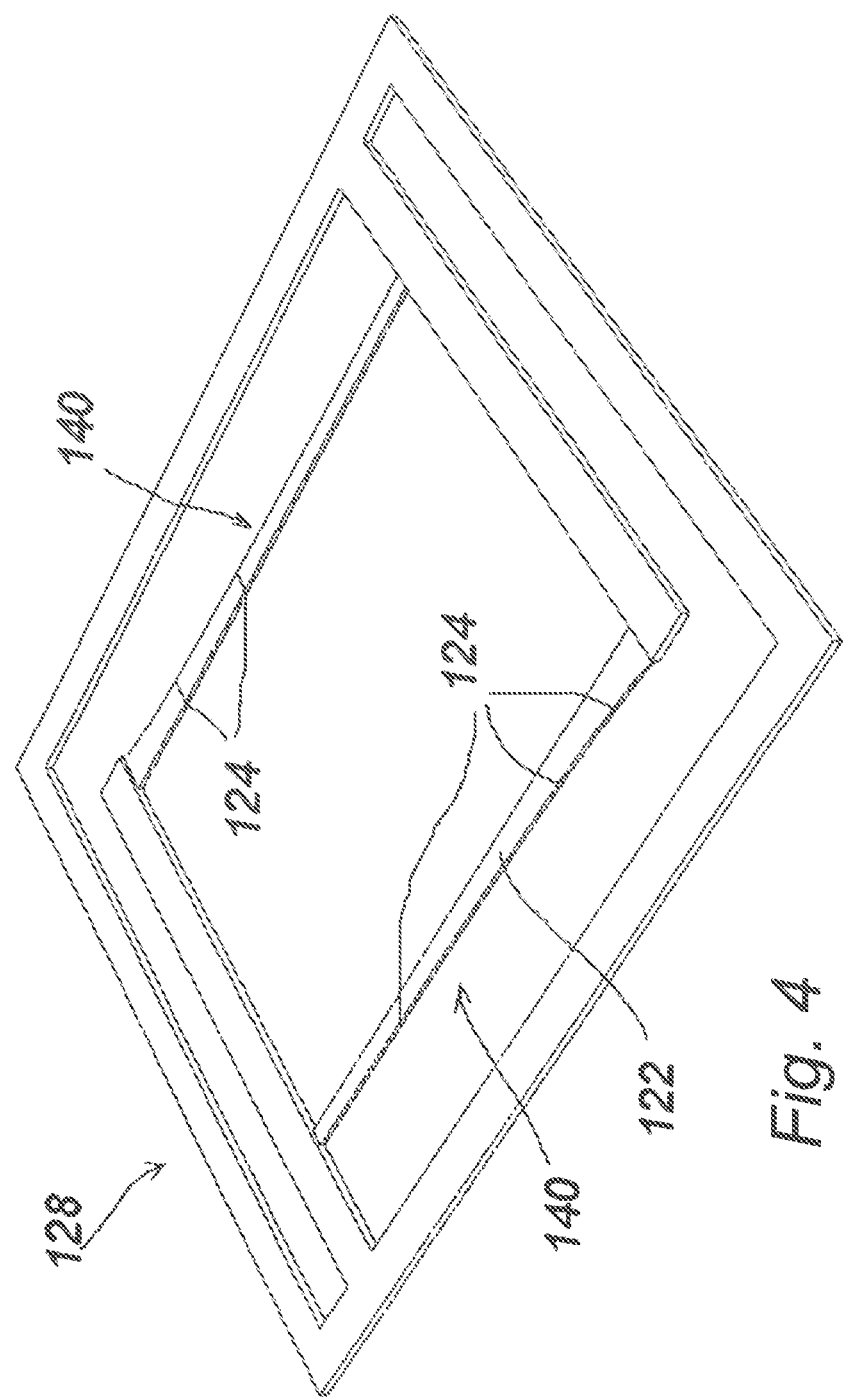
FIG. 4 shows an exemplary gasket structure.

FIG. 4 shows an exemplary gasket structure, which can be used in embodiments according to the present disclosure. The gasket structure 128 is, for example, made of compressible material with gas tight characteristics. The gasket structures 128 according to the present disclosure can be compressed when the cells are assembled to a stack formation. The gasket structures can also be pre-compressed at least from the flow parts 140. Heights of the flow restriction orifices 126, 136 are determined by a distance from at least one of a bottom of the flow distribution area and of the flow outlet area to a bottom of the gasket structure 128 to stabilize flow distribution in the repetitious structures of the stack having tolerance variations in electrolyte element 104 structure thickness. Similar pressure loss conditions between the cells can be accomplished by utilizing the gasket structure 128 which can be compressed and also pre-compressed at least from the flow parts 140 in order to accomplish even thermal distribution; i.e., similar thermal gradients between the cells in the stack. Thus the duty ratio of the solid oxide cell stack can be improved, and a lifetime of the solid oxide cell stack can be made longer.

Exemplary embodiments of the disclosure can also include an arrangement of larger flow ducts (i.e., flow channels) on the middle area of the electrolyte element and smaller flow ducts on the side areas of the electrolyte element. Also in exemplary embodiments of the disclosure the flow direction of at least one gas of fuel gas and oxygen rich gas at least in one single repetitious structure can be changed compared to at least another single repetitious structure by applying sealing means that enable the utilization of gas from an inlet opening and delivering the reaction product gas to an outlet opening that differs from the inlet opening and outlet opening of at least another single repetitious structure.

The fuel and oxygen rich gas flow directions on the electrolyte element compared to each other can be arranged to form a so called co-flow arrangement where both gas flows have essentially the same direction or to form a so-called counter-flow arrangement where the gas flow directions differ from each other essentially by 180°.

Figure 5:
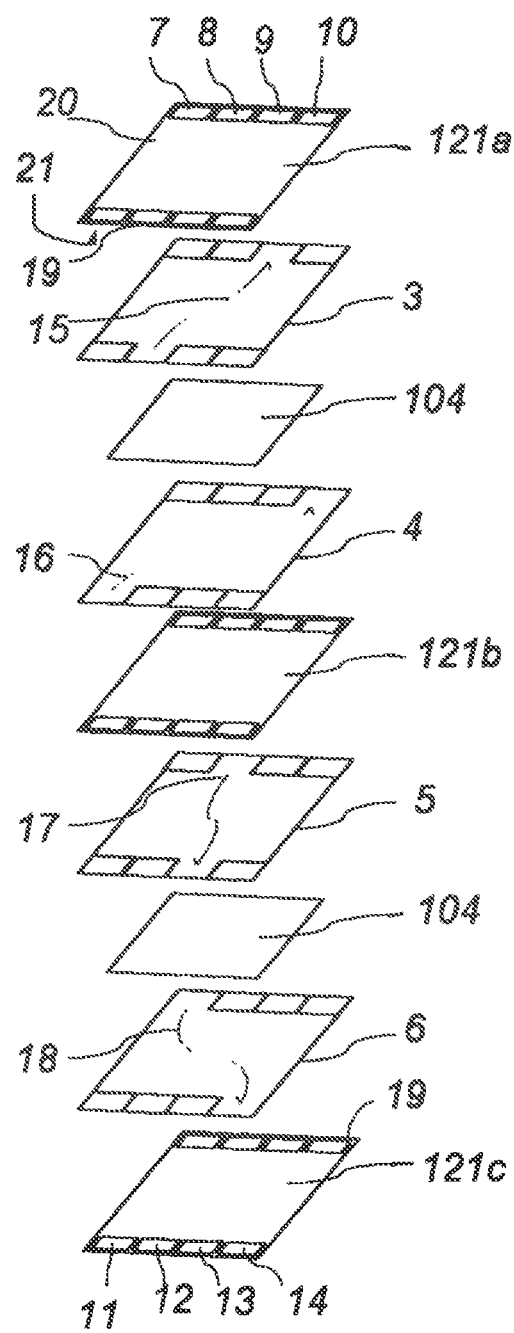
FIG. 5 shows exemplary flow field plates.

FIG. 5 shows exemplary flow field plates 121a, 121b, 121c of a fuel cell. A complete fuel cell stack as shown includes several plates 121 placed successively on each other in a shown manner. The plates in this embodiment are rectangular and symmetrical. An electrolyte element structure 104 having an electrolyte layer between an anode electrode and a cathode electrode is placed between the plates 121 substantially in the middle of the plate. The electrolyte element structure 104 may be any suitable electrolyte element structure and is not therefore described herein in any further detail. The flow field plates 121 and the electrolyte element structure 104 are sealed with sealing means 3-6. The purpose of the sealing means 3-6 is to ensure that oxidant and fuel are not directly mixed without the fuel cell reactions inside the electrochemically active area, that the fuel and oxidant are not leaked out from the electrochemical cells, that the adjacent electrochemical cells are not in electronic contact with each other, and that oxidant and fuel are supplied to the desired flow field plate planes 121. Two opposing flow field plates 121a, 121b, 121c and the electrolyte element structure 104 therebetween form a single repetitious structure. A flow field plate 121 is a planar thin plate that is made of metal alloy, ceramic material, cermet material or other material that can withstand chemical, thermal and mechanical stresses that are present in a fuel cell.

According to the disclosure, the flow field plate 121 includes inflow and outflow orifices placed at the edges of the plate 121. In this example the plate 121 is rectangular and flow orifices are placed on slightly shorter edges 19. Both of the edges 19 have four orifices, one inflow orifice 7, 11 for oxygen rich gas (in an exemplary embodiment: air), one outflow orifice 10, 14 for air, one inflow orifice 8, 12 for fuel, and one outflow orifice 9, 13 for fuel. The oxygen rich gas can be any gas or gas mixture, which includes a measurable amount of oxygen. On both of the edges 19 the orifices are arranged in a sequence that has first air in 7, 11, then fuel in 8, 12, then fuel out 9, 13, and then air out 10, 14. The surfaces of the first face 20 (in the FIG. top surface) and the second face 21 (below surface, not shown) around the edges of the flow field plate are shaped to allow efficient sealing and they limit a contoured surfaces 15-18 in the middle of the flow field plate that has a specific contour for guiding fuel gas and air over the surfaces of the electrolyte elements 104. It should be noted that the reference numerals 15-18 that depict arrows related to sealing means 3-6 that illustrate gas flow routes in FIG. 1 are also used to refer to a face and a contoured surface 15-18 of a flow field plate 121a, 121b, 121c that is facing towards the sealing means 3-6 that faces the sealing element or structure in question.

The number of the orifices for arranging the gas flows on a fuel cell stack may vary as well as the way how the gas flows are arranged. The basic idea is that orifices 7-14 on superposed flow field plates 121 are arranged so that their positions are matched and the orifices in same line form a gas manifold channel through the stack. Sealing means 3-6 are used in order to prevent feeding of the fuel and air to wrong layers between electrolyte elements and the flow field plates. The sealing means are arranged to surround each orifice 7-14 on the flow field plate 121. The flow field plate 121 and the sealing elements 3-6 are used to form ducts (i.e., channels) that go through the whole fuel cell stack. The orifices in the flow field plates are super positioned in order to form such a duct.

Exemplary embodiments enable the electrolyte element placement to be eased during the assembly process of the fuel cell stack or electrolysis cell stack. The gasket structure is shaped so that the electrolyte element can be placed a hole in the gasket structure which then locks the electrolyte element to its desired position both during the assembly process as well as gives a support for the electrolyte element during the fuel cell and electrolyzer stack operation.

While there have been shown and described and pointed out fundamental novel features of the invention as applied to exemplary embodiments thereof, it will be understood that various omissions and substitutions and changes in the form and details of the invention may be made by those skilled in the art without departing from the spirit of the invention. For example, it is expressly intended that all combinations of those elements which perform substantially the same results are within the scope of the invention. Substitutions of the elements from one described embodiment to another are also fully intended and contemplated. It is also to be understood that the drawings are not necessarily drawn to scale but they are merely conceptual in nature.

It will therefore be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A contacting arrangement of fuel electrode supported solid oxide cells, each solid oxide cell having at least two flow field plates to arrange gas flows in the cell, and an active electrode structure, which includes a fuel side, an oxygen side, and an electrolyte element between the fuel side and the oxygen side, wherein each solid oxide cell has an operating range of 500-1000° C., the contacting arrangement comprising: a gasket structure to perform sealing functions in a solid oxide cell; the gasket structure being made of compressible material with gas tight characteristics and pre-compressed between the at least two flow field plates;
   a contact structure configured for placement between flow field plates and an oxygen side of an active electrode structure in a repetitious structure, the contact structure being made of metal which is protectively coated with oxide structures, said metal being at least partly a gas permeable structure having perforated holes to enable gas flows through the holes and to increase electrical conductivity between the active electrode and the flow field plate to shorten transfer distance of electrons from the active electrode to the flow field plate through the contact structure, the shapes of the contact structure being configured and adapted according to structures of the flow field plates and according to structures of the oxygen side, and a thickness of the gasket structure being configured and adapted according to the shapes and structures of the contact structure and the flow field plate allowing tolerance variations to a thickness of solid oxide cells; and the arrangement comprises increased distances between adjacent holes and minimized sizes of the holes in the contact structure, the minimized hole size being smaller than the distance between any ridges of the flow field plate, which are extended to at least two adjacent gas channels to improve gas distribution characteristics and to increase a contact area of the contact structure.

2. The contacting arrangement of solid oxide cells according to claim 1, wherein the contact structure is adaptively gas permeable by at least one of:
form of the holes, size of the holes, distance between the holes, porosity of the contact structure and tortuosity of the contact structure.

3. The contacting arrangement of solid oxide cells according to claim 1, wherein the thickness of the contact structure is optimized according to at least one of:
heat transfer characteristics, electrical characteristics of the contacting arrangement and gas distribution characteristics.

4. A contacting method of contacting arrangement of fuel electrode supported solid oxide cells according to claim 1 in which gas flows, the method comprising:
sealing the solid oxide cell by a gasket structure, and locating a contact structure between flow field plates and an oxygen side of an active electrode structure, the contact structure being made of perforated metal, which is protectively coated with oxide structures; configuring and adapting said contact structure at least partly by a gas permeable structure having perforated holes according to the gas flows in the cell and according to structures of the oxygen side;
configuring and adapting a thickness of the gasket structure according to a thickness of the contact structure allowing tolerance variations to thickness of solid oxide cells; and
enhancing at least one of electric conductivity, heat transfer characteristics and mechanical support of the contact structure by selecting a distance between two adjacent holes and by minimizing size of the holes during a perforation of the contact structure.

5. The contacting method of contacting arrangement of fuel electrode supported solid oxide cells according to claim 4, comprising:
using a gas permeable structure of the contact structure adaptively based on the at least one of form of the holes, size of the holes, distance between the holes, porosity of the structure and tortuosity of the structure.

6. The contacting method of contacting arrangement of fuel electrode supported solid oxide cells according to claim 4, comprising:
optimizing the thickness of the contact structure according to at least one of heat transfer characteristics, electrical characteristics of the contacting arrangement and gas distribution characteristics.

7. The contacting arrangement according to claim 1, in combination with at least two solid oxide cells, each solid oxide cell comprising:
at least two flow field plates to arrange gas flows in the cell, and an active electrode structure, which includes a fuel side, an oxygen side, and an electrolyte element between the fuel side and the oxygen side.

* * * * *